Feb. 15, 1949. B. H. SCHENK 2,461,976
METHOD OF MAKING FLATTENED THERMOPLASTIC TUBING
OF PREDETERMINED DESIRED CHARACTERISTICS
Filed Oct. 20, 1945 2 Sheets-Sheet 1
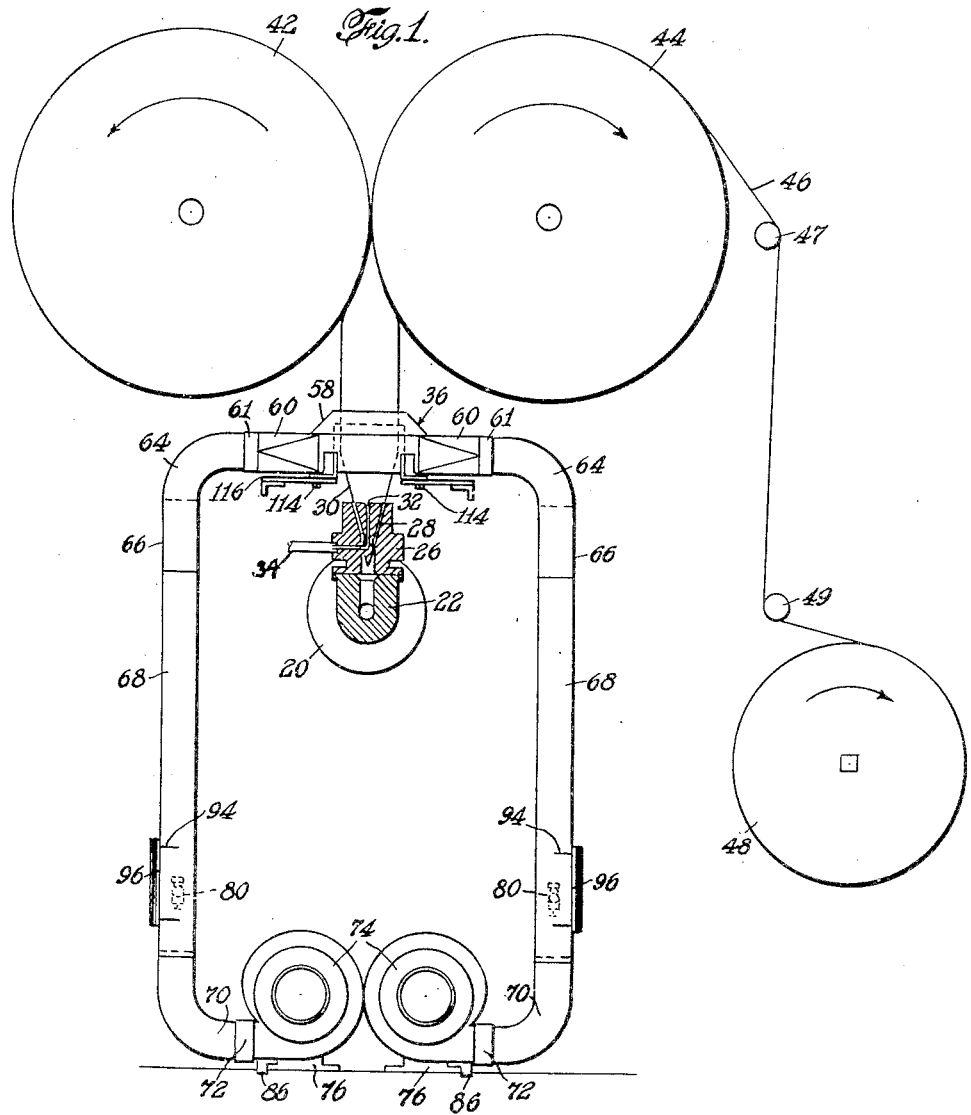
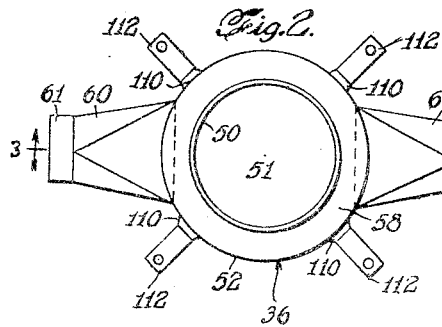
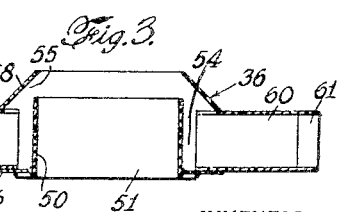
INVENTOR.
BERNARD H. SCHENK
BY
ATTORNEY

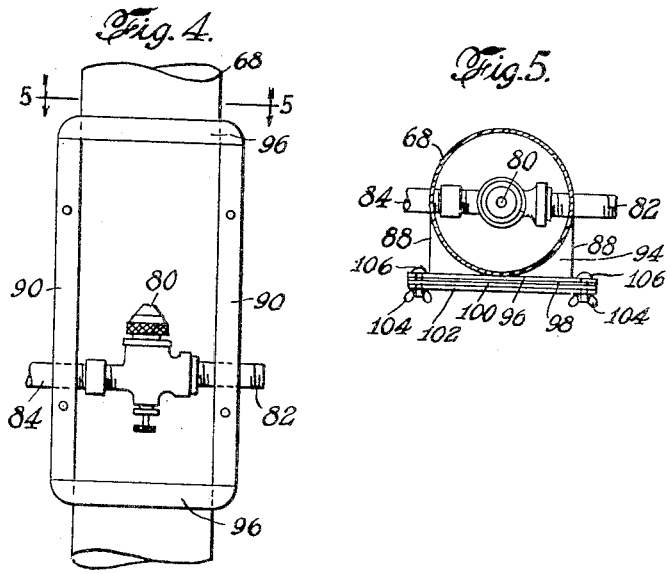
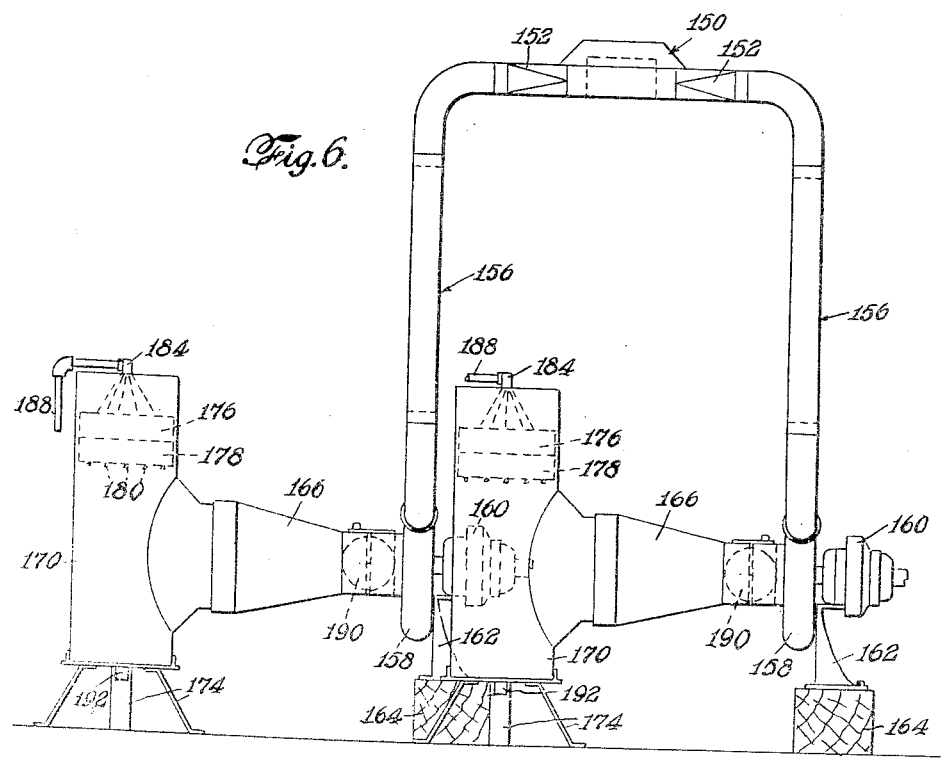

Patented Feb. 15, 1949

2,461,976

UNITED STATES PATENT OFFICE 2,461,976

METHOD OF MAKING FLATTENED THERMOPLASTIC TUBING OF PREDETERMINED DESIRED CHARACTERISTICS

Bernard H. Schenk, Western Springs, Ill., assignor to The Visking Corporation, Chicago, Ill., a corporation of Virginia Application October 20, 1945, Serial No. 623,472

8 Claims. (Cl. 18—57)

This invention relates to tubing, and more particularly to a new and improved dry process for producing thin-walled continuous seamless tubing of predetermined characteristics from thermoplastic organic materials.

Copending application of Edward D. Fuller, Serial No. 623,470, filed October 20, 1945, for "Method of producing tubing of predetermined desired characteristics," discloses a process wherein a thermoplastic organic material is extruded from a melt through an annular die to form a seamless tubing and, as the tubing is being drawn from the die and while it is in the formative plastic state, the tubing is inflated to a predetermined diameter and the tubing set at approximately the point where said tubing has reached the desired diameter. The tubing is set, i. e. converted, by chilling, from the plastic formative state to the set condition, by an external air flow directed to and applied on and around the advancing tubing while in the formative plastic state. The external air flow which constitutes the setting medium is compressed atmospheric air which is conducted from a source of supply, where atmospheric air is maintained under compression, to a spiral perforated cooling ring which directs the flow on and around the tubing. At the source of supply, the air is maintained under a pressure considerably higher than the pressure at the spiral cooling ring, and the reduction in pressure is obtained by conventional pressure regulators. In general, the pressure at the spiral is from 1 to 10 lbs. per square inch, gauge pressure, and the pressure at the source of supply may be considerably higher, such as 80 lbs. per square inch, gauge pressure.

Though by the foregoing process highly satisfactory results have been obtained, the use of compressed air presents a problem of supply and is relatively expensive.

An object of this invention is to provide a new and improved process of preparing thin-walled continuous seamless tubing from a melt of a thermoplastic organic material.

Another object of this invention is to provide a dry method of preparing thin-walled continuous seamless tubing of predetermined characteristics from a melt of a thermoplastic organic material.

An additional object of this invention is to provide a new and inexpensive method of setting a tubing obtained by dry-extruding a thermoplastic organic material from a melt thereof through an annular die.

A further object of this invention is to provide a method of setting a tubing obtained by extruding a thermoplastic organic material from a melt thereof through an annular die with low pressure air laden with moisture.

Other and additional objects will become apparent hereinafter.

The objects of this invention are accomplished, in general, by dry-extruding a thermoplastic organic material from a melt thereof through an annular die to form a seamless tubing and, as the tubing is being drawn from the die and while it is in the formative plastic state, inflating the tubing to a predetermined diameter and setting the tubing, at approximately the point where said tubing has reached the final desired diameter, with low pressure moist air.

The term "formative plastic state" is used herein to define that state of the plastic wherein the plastic is in an unset or partly set condition and can be permanently enlarged, as by stretching.

The drawing of the tubing from the die is obtained by a pair of squeeze rolls which also serve to collapse the inflated tubing into the form of a ribbon, in which condition it is wound up on a wind-up reel. The squeeze rolls may be driven at a speed that stretches the tubing while in the plastic formative state, thus affecting the physical properties of the tubing. Hence, the peripheral speed of the squeeze rolls is selected so that, in combination with the other controlled variables of the process, tubing of predetermined characteristics is obtained.

The inflation of the tubing is obtained by a gaseous medium introduced into the interior of the tubing. The inflating medium is entrapped or confined between the nip of the squeeze rolls and the die through which the molten thermoplastic material is extruded. As a result, the inflating medium comprises an isolated gaseous bubble which bodily advances while remaining substantially constant in quantity through the successive portions of the tubing withdrawn from the die by the squeeze rolls. The quantity of the gaseous medium constituting the entrapped or confined inflated medium (isolated bubble) is selected so that the extruded tubing, while still in the formative plastic stage, will be inflated to that diameter necessary to produce the predetermined desired flat width when the tubing is flattened by the squeeze rolls. The inflation of the tubing can expand the tubing whereby the physical properties of the film constituting the tubing will be affected. Thus, by correlating the inflation of the tubing with the other variables in the process, a tubing of predetermined flat width and other predetermined characteristics can be obtained.

The tubing is converted from the formative plastic state to the set condition by directing and applying air, to which water has been added in the form of a fog, mist or spray, on or around the tubing while in the plastic formative state. The water, which can be added to the air in any convenient manner, not only cools the air but also exerts an additional cooling effect on the tubing due to the minute water droplets carried by the air. By this procedure, satisfactory setting of the extruded tubing can be obtained with the use of low pressure air in moderate amounts, which has not been possible heretofore.

The cooling, by moist air, of the tubing is regulated in accordance with volume and temperature of the setting medium, so that the inflation of the tubing while in the plastic formative state can be effected either near the lips of the die or the squeeze rolls, as desired. The control of the point of inflation of the tubing aids in controlling within narrow tolerances the flat width and wall thickness of the finished tubing. It also permits control of the structural characteristics of the tubing (orientation).

In the manufacture of thermoplastic tubing by the process of this invention, the following dimensions and properties of the finished tubing are capable of variation and can be controlled:

(1) Flat width of tubing;
(2) Wall thickness of tubing;
(3) Machine-direction properties: structural characteristics of the tubing (i. e. tear resistance, tensile strength, etc.);
(4) Transverse-direction properties: structural characteristics of the tubing (i. e. tear resistance, tensile strength, etc.).

As will hereafter become more apparent, the desired dimensions and physical properties of the tubing are predetermined and the variables in the process are adjusted to produce the desired results.

The process is not restricted to any particular apparatus. It is capable of being carried out in apparatus such as shown in the accompanying drawings, and wherein:

Figure 1 is in an end view, partly in section, of one form of an apparatus;

Figure 2 is a top plan view of the cooling ring shown in Figure 1;

Figure 3 is a section taken on the line 3—3 of Figure 2;

Figure 4 is an enlarged side view of the access window shown in Figure 1;

Figure 5 is a section taken on the line 5—5 of Figure 4; and

Figure 6 is an end view, partly in section but with the extruder and die omitted, of another form of apparatus.

Referring now to the drawings wherein like reference numerals designate like parts, the reference numeral 20 generally designates an extruder which is a known type of National Thermoplastic Extruders, manufactured and sold by the National Rubber Machinery Corporation, of Akron, Ohio.

The specific details of construction of the extruder form no part of this invention. In general, the extruder is of the type wherein the selected thermoplastic material is fed from a feed hopper at one end of the extruder into a screw chamber where there is positioned a single threaded pitch screw which, upon rotation, advances the plastic through the extruder. As the thermoplastic material is fed by the screw through the extruder, which is heated in any appropriate manner, as by a heating medium circulating through a jacket chamber around the extruder, it is melted and, in such condition, is fed into a 90°-elbow 22 secured to the head of the extruder. A die 26 is secured in any appropriate manner to the outlet end of the elbow, and the molten thermoplastic passes therethrough.

The die 26 is provided with an annular orifice 28 from which the molten mass emerges in the air as a hot gumlike viscous thermoplastic tubing 30. The die 26 is provided with a central orifice 32 which is connected to an air supply 34, whereby air is introduced interiorly of the tubing to inflate the same. The air supply 34 is provided with a valve (not shown) so that, when the desired quantity of air has been introduced within the tubing, further supply thereof can be prevented. In the event the quantity of air decreases, as, for example, by leakage or otherwise, the requisite quantity of air can be added by proper manipulation of the valve.

The inflated tubing 30 is drawn from the die 26 in a substantially vertical direction through a cooling ring, generally designated by the reference numeral 36, and thence through the circumambient atmosphere by a pair of rotating squeeze rolls 42 and 44, which also served to collapse the tubing passing therebetween into a flattened ribbon-like material. The flattened tubing, designated by the reference numeral 46, passes over the roll 44 and is wound up on a wind-up reel 48 driven by a torque motor (not shown). Intermediate the squeeze roll 44 and the wind-up reel 48, guide rolls 47 and 49 serve to direct the flattened tubing from the squeeze roll 44 to the wind-up reel 48.

The cooling ring 36 comprises an inner cylindrical member 50 and an outer cylindrical member 52 spaced therefrom to form an air chamber 54. The cylindrical member 50 forms a circular passage 51 through which the tubing passes, as will become apparent hereinafter. The diameter of this passage 51 is slightly greater than the diameter of the inflated tubing passing therefrom. An annular disc 56 is secured adjacent the bottom of the members 50 and 52 and constitutes a bottom closure for the chamber 54. As shown in Figure 3 of the drawings, the inner cylindrical member 50 is of a height greater than the outer cylindrical member 52. A conical section 58, the wall of which is inclined 45° to the horizontal, is secured to the outer cylindrical member 52, and the free end thereof is in substantial alignment with but spaced from the top of the inner cylindrical member 50 to provide an annular discharge orifice 55 from the chamber 54.

The setting medium is fed into chamber 54 by a pair of diametrically opposite, flared inlets 60. The flared end of each inlet 60 is positioned in an opening in the outer member 52 and appropriately secured on the bottom 56.

The tubing 30, as it is extruded from the die 26, is drawn upwardly through the circular passage 51 interiorly of the inner cylindrical member 50 and, as it is being drawn upwardly, the cooling medium is introduced by the inlets 60 into the chamber 54 of the cooling ring 36 and passes therefrom through the discharge orifice 55. The inner cylindrical member 50 also serves as a baffle to direct and distribute the chilling medium to all parts of the chamber 54 prior to passage thereof through the orifice 55, whereby an annular stream of the cooling medium is directed to and applied on the tubing 30 which passes in close proximity to the discharge orifice 55 of the cooling ring 36.

The cooling medium comprises low pressure air laden with moisture, and the manner of producing such air laden with moisture and the supply thereof to the inlets 60 will now be explained. Since each inlet 60 is supplied by identical means, only one such means will be described in detail.

The narrow end 61 of each inlet 60 is appropriately secured to one end of a 90°-elbow 64. The other end of the elbow 64 is secured by a slip joint 66 to one end of a pipe 68. The other end of the pipe 68 is secured to one end of a 90°-elbow 70, the other end of said elbow 70 being connected to a discharge 72 of a motor-driven centrifugal blower 74. The blowers 74 are carried on supports 76. It is clear that upon operation the centrifugal blowers 74 will draw in air from the atmosphere and blow it up through the respective lines formed by the sections 64, 66, 68 and 70 into the respective inlets 60, from whence it will pass into the chamber 54 and thence therefrom through the discharge orifice 55 at the top of the cooling ring 36.

To supply moisture to the air, each line, as, for example section 68 thereof, is provided with an adjustable spray nozzle 80 which is connected to a compressed air line 82 and a water supply 84. Thus, as the atmospheric air is blown through the lines to the cooling ring, the air will carry with it the atomized water. Each line is provided with a drain 86 whereby accumulated water can be removed from the system.

To permit inspection of and access to the spray nozzle 80 whereby adjustments can be made as required, a removable window is provided in the section of the line opposite the nozzle. As shown in Figure 5, section 68 is slit, and the slit portions are bent out to form arms 88 which, in turn, are bent outwardly to form the flanges 90. End pieces 94 are secured adjacent the top and bottom of the opening formed by the slitting of the section 68, and the respective outer ends thereof are bent to form flanges 96. The flanges 90 and 96 lie in the same vertical plane and constitute a support on which the window is removably secured. In the form shown in Figure 5, a gasket 98 is disposed on the flanges 90 and 96, and a sheet of a transparent material 100, such as pyroxylin, is positioned on the gasket 98. A frame 102 is positioned on the transparent sheet 100. Wing nuts 104, cooperating with screws 106 passing through aligned holes in the flanges 90, gasket 98, transparent sheet 100 and frame 102, secure the window in position. By removing the wing nuts 104, the window (transparent material 100) can be removed and access had to the atomizer.

The cooling ring 36 is also carried on a plurality of equally spaced brackets, each of which is provided with a vertical member 110 and a horizontal member 112. The vertical members 110 are in engagement with the inner surface of the inner ring member 50, and the horizontal members 112 are secured by bolts 114 to a support 116 appropriately mounted in the apparatus.

Another embodiment for introducing moisture into the air is shown in Figure 6. In this embodiment, the cooling ring and the lines delivering the moisture-laden air thereto are the same as those in the embodiment previously described. Each line, however, is provided with means to introduce moisture into the air fed therethrough as will now be explained.

Referring now to Figure 6, the reference numeral 150 designates a cooling ring of a construction identical with the cooling ring 36 of the previous embodiment. The cooling medium is fed to the cooling ring 150 from diametrically opposite inlets 152 which are connected to separate lines 156. Each line 156 is formed of sections identical to the lines of the previously described embodiment.

Each line 156 is connected to the discharge end of a blower 158 which is driven by a motor 160 carried on a bracket 162 mounted on a support 164. The inlet end of each blower is connected to one end of a transition piece 166. The other end of the transition piece 166 is secured to a conduit 170, which is closed at the bottom thereof and is mounted on a support 174 secured to the floor. Adjacent the open top of such conduit 170, there are provided two superimposed discs 176 and 178 of spun glass. Each disc fits tightly in the conduit 170, and the lower disc 178 is supported on a plurality of spaced wires 180 extending transversely across the conduit 170. Adjacent the open top of the conduit 170, there is a spray nozzle 184, which is connected by an appropriate line 188 to a source of supply (not shown). A butterfly damper 190 in the transition piece 166 adjustably controls the amount of cooling medium to be supplied to the air ring. A drain 192 permits removal of water accumulating on the bottom of the conduit 170.

In the embodiment shown in Figure 6, the air is drawn by the blowers 158 through respective open tops of the conduits 170 and fed to the cooling ring 150 through the respective lines. As the air is introduced into the system and as it passes through the conduits, it carries with it the finely divided particles of water.

In carrying out the process of this invention, the selected thermoplastic is introduced into the extruder and the feed screw rotated at a certain speed whereby the thermoplastic in the molten state is extruded through the annular orifice of an appropriately selected die. The extruded material, which is in the form of seamless tubing, is then passed between the nip of the squeeze rolls. Inflating air is introduced into the interior of the portion of the tubing extending between the die and nip of the draw rolls in the amount required to inflate the tubing to the desired diameter. This is determined by increasing or decreasing the amount of inflating air, as is indicated upon measurement of the flat width of the collapsed tubing. The quantity of the cooling medium, depending on the place in the upward path of travel of the tubing where the tubing is to be set, is next determined. The amount of moisture-laden air, while it is fairly constant for a particular set of conditions, is subject to change in accordance with changes in the following variables:

1. Speed of upward travel of the extruded tubing;
2. Temperature of the cooling medium;
3. Moisture content of the cooling medium;
4. Room temperature;
5. Temperature of the extruded material;
6. Specific heat of the thermoplastic.

It is to be noted that in the process hereinbefore generally described, the internal air (inflating) pressure, the volume of the cooling medium, the moisture content of the cooling medium, and the diameter of the die are balanced against each other (all the other variables being maintained constant) as is necessary to produce tubing of predetermined characteristics.

The details and manner of practicing the invention will become apparent from the following specific examples, it being understood that these examples are merely illustrative embodiments of the invention and that the scope of the invention is not restricted thereto.

*Example I*

To produce a tubing 8" in flat width and 0.003" in (wall) thickness, whose tensile strength in the machine direction is approximately equal to its tensile strength in the transverse direction, and whose tear resistance in the machine direction is approximately equal to its tear resistance in the transverse direction.

Molten polyethylene was extruded at the rate of 17.5 pounds per hour through a die having an annular orifice of 0.018" and 2.5" in diameter (between the inner lip thereof), the temperature of the polyethylene at the lips being 270°–290° F. The extruded tubing was withdrawn upwardly in a vertical direction from the die at the rate of 15' per minute by the squeeze rolls positioned 20" above the die. Sufficient air, necessary to inflate the tubing while in the plastic formative state to a final diameter of 5.1" which, upon flattening, will produce a flat width of 8", was introduced interiorly of the tubing. When this quantity of air had been introduced, the supply thereof was cut off and the air within the tubing comprised an isolated bubble which was sealed in the tubing between the top of the die and the nip of the squeeze rolls. As soon as the tubing was withdrawn from the die, the gaseous bubble began to inflate the tubing. The tubing was drawn through the zone of action of the cooling ring. 910,000 cubic inches per minute of the cooling medium, consisting of air of 88% relative humidity and at a temperature of 73° F., was supplied by the cooling ring to the outer circumference of the upwardly advancing tubing as the latter passed through the zone of action of the cooling ring. The tubing, which started to expand by reason of the internally applied air as soon as it left the lip of the die, was expanded to its final diameter within approximately 2" to 4" of its upward travel, and the stream of external cooling medium was applied to set the expanded tubing.

After the tubing had passed out of the zone of action of the cooling medium, it passed through an unconfined circumambient atmosphere, which in this example was the atmosphere of the room in which the apparatus was located.

*Example II*

To produce a tubing 8" in flat width and 0.003" in (wall) thickness, whose tensile strength in the machine direction is higher than its tensile strength in the transverse direction, and whose tear resistance in the transverse direction is greater than its tear resistance in the machine direction.

The procedure and conditions are the same as those described in Example I, except that a smaller volume of cooling medium, i. e. air of 88% humidity and at a temperature of 73° F., such as 534,000 cubic inches per minute, was supplied by the cooling ring to the outer circumference of the upwardly advancing tubing.

This quantity of cooling medium did not wholly set the extruded tubing but only a part (surface) thereof. Thus, the tubing was still in the formative plastic state and capable of easy expansion, even though some cooling had taken place.

All things being equal, a tubing in the formative plastic state tends to expand at its thinnest point. As the tubing was being drawn by the squeeze rolls, it was acquiring a machine direction linear expansion, the film becoming thinner and thinner as it was being drawn upwardly. The film reached its least (and final) thickness just before contact with the draw rolls, at which point the air pressure of the confined bubble expanded the tube to the predetermined desired diameter.

*Example III*

To produce a tubing 8" in flat width and 0.003" in (wall) thickness, whose tensile strength in the transverse direction is higher than its tensile strength in the machine direction, and whose tear resistance in the machine direction is greater than its tear resistance in the transverse direction.

The procedure and conditions are the same as those described in Example I, except that a die having an annular orifice 0.018" wide and 1" in diameter (between the inner lips) was utilized.

It is apparent that this procedure is substantially the method of Example I in all particulars except that, due to the utilization of a smaller die, the tubing is expanded to a greater degree whereby the desired properties are obtained.

In each of the above examples, the cooling medium, i. e. air laden with moisture, is only under the pressure required to force it through the system, and which is, in general, less than 0.1 pound per square inch greater than atmospheric pressure.

Though the specific examples describe the invention in connection with the production of seamless tubing of predetermined desired characteristics from polyethylene, it is to be understood that the invention is not restricted thereto. In general, the invention can be utilized with any thermoplastic material and mixture of synthetic rubbers with thermoplastic materials. Each thermoplastic substance or composition possesses certain properties which may make it necessary to determine, by experiment, the extent the variables have to be balanced in order to produce tubing of the desired results. This may be especially so with regard to the quantity of cooling medium and the moisture content thereof, since the temperature at the lips of the die may be different with different thermoplastic substances or compositions. Hereinafter, is set forth a list of illustrative thermoplastic materials which can be used in this invention, the temperatures of the melt at the lips of the die being also given:

| Material | Temperature of melt at lips of die (°F.) |
|---|---|
| Cellulose acetate | 360–380 |
| Cellulose acetate butyrate | 350–360 |
| Ethyl cellulose | 400–420 |
| Methyl methacrylate polymer | 470–490 |
| Nylon (extrusion or molding grade) | 475–525 |
| Polystyrene | 470–490 |
| Polyvinyl formal—acetate butyral | 300–340 |
| Copolymers of vinyl chloride and vinyl acetate (Vinylite) | 330–340 |
| Polyvinyl chloride (Geon) | 350–370 |
| Copolymers of vinyl chloride and vinylidene chloride (Saran) | 360–370 |

Though the results can be obtained when the temperature of the thermoplastic at the lips of the die is as above given, the temperature of the lips can be 85° F. higher than the melting point of the plastic used but not greater than 525° F.

The properties of the thermoplastic substance or composition can be modified as by the incorporation therein of suitable modifying agents, such as plasticizers, fillers, coloring agents, heat decomposition inhibitor, anti-oxidant, etc.

In the examples, the cooling ring was positioned so that the discharge orifice thereof was located approximately 6" to 8" above the face of the die. The location of the discharge orifice of the cooling ring with respect to the die depends on the size of said orifice.

In the examples, the internal air pressure, the volume of the cooling medium, and the diameter of the die were balanced against each other to produce tubing of the predetermined desired characteristics, while all the other conditions (such as, for example, screw speed, temperature of extrusion, speed of squeeze rolls, room temperature, width of die orifice, moisture content of cooling medium, etc.) were maintained constant. Obviously, if one or more of the conditions which were maintained constant in the examples were varied, the internal air pressure, the volume of the cooling medium, and the diameter of the die would have to be further balanced to compensate for such variations. Such determination of the necessary conditions can, in accordance with the teachings of the instant invention, be determined by simple experiment. In general, however, since in any apparatus certain features thereof can be maintained constant, the three variables (internal air pressure, volume of cooling medium, and diameter of the die) are the most easily varied and controlled.

The invention has been described in connection with an inflating medium consisting of air. Since air is relatively cheap and available, it is preferred. However, any other gaseous medium which does not exert any deleterious effect on the tubing being produced can be used.

In the invention as hereinbefore specifically described, the cooling medium applied by the cooling ring consisted of air at a temperature of 73° C. and of a relative humidity of 88%. However, the invention is not restricted to such specific air laden with moisture. In general, the air laden with moisture is at such a temperature and contains such a quantity of finely divided water particles that when it issues from the cooling ring it will be in the form of a fog or mist.

The invention herein described is particularly suitable for the production of thin-walled continuous tubing. Though, as shown by the examples, tubing having a wall thickness of 0.003" can be produced, tubing having a wall thickness as low as 0.0005" and as high as 0.020" or higher has also been produced.

In general, the width of the die orifice is not material. It should be of a width to provide the molten material in sufficient amount to produce the predetermined sized tubing.

The diameter of the die between the lips thereof is such that the tubing in the plastic formative stage can be inflated to a diameter of from 0.7 to 5 times the diameter of the die. Highly satisfactory results are obtained when the ratio of inflation of the tubing to the diameter of the die is 1.25:1.

Though the method has been herein described in connection with expanding the extruded tubing while in the formative plastic state to a diameter greater than the diameter of the die, the invention is not restricted thereto. The method can be utilized in the production of tubing of predetermined characteristics and of a diameter less than the diameter of the die. This is obtained by increasing the speed of the squeeze rolls and utilizing only sufficient internal air pressure to hold the tubing in the inflated condition at the desired diameter, it being understood, of course, that the tubing in the formative plastic state is subjected to cooling as herein described.

In the preferred embodiment of the invention, the tubing is extruded in an upward direction. Though this is the preferred embodiment, the principles of the invention can also be utilized for extruding horizontally or downwardly.

The invention provides a method of utilizing low pressure air, i. e. substantially at atmospheric pressure, to effectively and satisfactorily set a seamless tubing formed by dry-extruding a melt of a thermoplastic substance. The invention is particularly useful with high speed operation or when room air reaches a condition where sufficient cooling can no longer be obtained by the use of room air alone.

Since it is obvious that various changes and modifications may be made in the above description without departing from the nature or spirit thereof, this invention is not restricted thereto except as set forth in the appended claims.

I claim:

1. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and the point of flattening, the quantity of the gaseous medium constituting said bubble being such as to inflate the tubing while in the plastic formative state to a predetermined desired diameter at a point beyond the point of extrusion, said predetermined diameter being different from that of the tubing at the point of extrusion, and blowing onto the exterior surface of the tubing while in the plastic formative state a cooling medium consisting of atmospheric air laden with added moisture in such volume that said tubing will be set when the tubing has been inflated by said bubble to the desired predetermined diameter, the rate of withdrawing the tubing, the degree of inflation of the tubing and the degree of chilling of the tubing all being correlated in accordance with predetermined desired physical characteristics of the tubing.

2. A method as set forth in claim 1 wherein the tubing is continuolsy withdrawn from the point of extrusion in an upward vertical direction.

3. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and the point of flattening, the quantity of the gaseous medium constituting said bubble being such as to inflate the tubing while in the plastic formative state to a predetermined desired diameter at a point beyond the point of extrusion, said predetermined diameter being different from that of the tubing at the point of extrusion, and blowing onto the exterior surface of the tubing while in the plastic formative state a cooling medium consisting of atmospheric air laden with added moisture in such volume that said tubing will be set when the tubing has been inflated by said bubble to the desired predetermined diameter, said cooling medium being at a pressure not exceeding 0.1 pound per square inch greater than atmospheric pressure, the rate of withdrawing the tubing, the degree of inflation of the tubing and the degree of chilling of the tubing all being correlated in accordance with predetermined desired physical characteristics of the tubing.

4. A method as set forth in claim 3 wherein the tubing is continuously withdrawn from the point of extrusion in an upward vertical direction.

5. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and the point of flattening, the quantity of the gaseous medium constituting said bubble being such as to inflate the tubing while in the plastic formative state to a predetermined desired diameter at a point beyond the point of extrusion, said predetermined diameter being different from that of the tubing at the point of extrusion, and blowing onto the exterior surface of the tubing while in the plastic formative state a mist consisting of atmospheric air laden with added minute particles of water in such volume that said tubing will be set when the tubing has been inflated by said bubble to the desired predetermined diameter, the rate of withdrawing the tubing, the degree of inflation of the tubing and the degree of chilling of the tubing all being correlated in accordance with predetermined desired physical characteristics of the tubing.

6. A method as set forth in claim 5 wherein the tubing is continuously withdrawn from the point of extrusion in an upward vertical direction.

7. In a method of producing flattened tubing of predetermined desired characteristics, the steps which comprise continuously dry-extruding a molten thermoplastic in the form of a seamless tubing, continuously withdrawing the tubing from the point of extrusion, flattening the tubing at a point spaced from the point of extrusion, maintaining a substantially constant continuous isolated bubble of a gaseous medium in the section of the tubing extending between the point of extrusion and the point of flattening, the quantity of the gaseous medium constituting said bubble being such as to inflate the tubing while in the plastic formative state to a predetermined desired diameter at a point beyond the point of extrusion, said predetermined diameter being different from that of the tubing at the point of extrusion, and blowing onto the exterior surface of the tubing while in the plastic formative state a mist consisting of atmospheric air laden with added minute particles of water in such volume that said tubing will be set when the tubing has been inflated by said bubble to the desired predetermined diameter, said mist being at a pressure not exceeding 0.1 pound per square inch greater than atmospheric pressure, the rate of withdrawing the tubing, the degree of inflation of the tubing and the degree of chilling of the tubing all being correlated in accordance with predetermined desired physical characteristics of the tubing.

8. A method as set forth in claim 7 wherein the tubing is continuously withdrawn from the point of extrusion in an upward vertical direction.

BERNARD H. SCHENK.

REFERENCES CITED

The following references are of record in the file of this patent:

UNITED STATES PATENTS

| Number | Name | Date |
|---|---|---|
| 2,027,962 | Currie | Jan. 14, 1936 |
| 2,047,554 | Fischer | July 14, 1936 |
| 2,070,247 | Weingand et al. | Feb. 9, 1937 |
| 2,161,561 | Dalton | June 6, 1939 |
| 2,227,682 | Wade | Jan. 7, 1941 |
| 2,337,927 | Reichel et al. | Dec. 28, 1943 |
| 2,346,187 | Reichel | Apr. 11, 1944 |
| 2,409,521 | Wiley | Oct. 15, 1946 |
| 2,422,953 | Davies et al. | June 24, 1947 |
| 2,423,260 | Slaughter | July 1, 1947 |

OTHER REFERENCES

Handbook of Chemistry and Physics 28th ed., 1944, Chemical Rubber Publishing Co., pages 1694, 1719, 1721.